(12) United States Patent
Linden (10) Patent No.: US 9,594,294 B2
(45) Date of Patent: Mar. 14, 2017

(54) MOUNT FOR A WIRED DEVICE

(71) Applicant: AXIS AB, Lund (SE)

(72) Inventor: Olle Linden, Hollviken (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/221,534

(22) Filed: Mar. 21, 2014

(65) Prior Publication Data

US 2014/0334810 A1 Nov. 13, 2014

(30) Foreign Application Priority Data

May 7, 2013 (EP) ..................................... 13166860

(51) Int. Cl.
*G03B 17/56* (2006.01)
*F16M 11/08* (2006.01)
(Continued)

(52) U.S. Cl.
CPC ........... *G03B 17/561* (2013.01); *F16M 11/08* (2013.01); *F16M 11/2014* (2013.01); *G08B 13/19632* (2013.01); *Y10T 29/49826* (2015.01)

(58) Field of Classification Search
CPC .... G03B 17/561; H01R 13/62; H01R 13/639; H01R 13/6395
(Continued)

(56) References Cited

U.S. PATENT DOCUMENTS 153,348 A 7/1874 King
325,333 A 9/1885 Flagstad
(Continued)

FOREIGN PATENT DOCUMENTS

CA 2299830 A1 2/2001
CN 1694510 A 11/2005
(Continued)

OTHER PUBLICATIONS

European Search Report, European Patent Application No. 113166860.0, Nov. 25, 2013, 7 pp.

*Primary Examiner* — Rochelle-Ann J Blackman
(74) *Attorney, Agent, or Firm* — Volpe and Koenig, P.C.

(57) ABSTRACT

The present invention relates to a mount for a wired device, the mount comprising: a base (10), an attachment part (20) provided with a terminal (21), and an eccentric hinge (14) having a first pivot (15) a second pivot (16), said second pivot (16) being movable relative said first pivot (15) in a plane defined by a first direction X parallel to said mount plane (42) and by a second direction Z normal to said mount plane (42), said attachment part (20) being releasably connectable to said base (10) by means of said eccentric hinge (14), wherein said attachment part (20), when connected to said base (10), is movable between an open position, providing access to said terminal (21), and a closed position. The distance (d) between said first pivot (15) and said second pivot (16) in said closed position has a first component ($d_x$) in said first direction X and a second component ($d_z$) in said second direction Z, said first component ($d_x$) being greater than said second component ($d_z$). The present invention also relates to a method for mounting said mount.

13 Claims, 8 Drawing Sheets

(51) Int. Cl.
*F16M 11/20* (2006.01)
*G08B 13/196* (2006.01)

(58) Field of Classification Search
USPC .......... 396/427, 428; 348/143, 373; 16/327, 16/362, 364, 366
See application file for complete search history.

(56) References Cited

U.S. PATENT DOCUMENTS

| | | | |
|---|---|---|---|
| 1,470,429 | A | 10/1923 | Dunbar |
| PP8,090 | P | 1/1993 | Walters |
| 6,206,284 | B1 | 3/2001 | Do et al. |
| 6,259,476 | B1 | 7/2001 | Greene |
| 6,378,173 | B1 | 4/2002 | Ho et al. |
| 6,449,431 | B1 * | 9/2002 | Cuddeback et al. ............ 396/27 |
| 2003/0039094 | A1 * | 2/2003 | Sarkinen .............. H05K 5/0017 361/679.27 |

FOREIGN PATENT DOCUMENTS

| | | |
|---|---|---|
| CN | 101196209 A | 6/2008 |
| CN | 202121692 U | 1/2012 |
| CN | 202791244 U | 3/2013 |
| CN | 103067652 A | 4/2013 |
| DE | 3533988 A1 | 4/1987 |
| DE | 29914275 U1 | 11/1999 |
| DE | 202005018350 U1 | 1/2006 |
| EP | 1 593 903 A3 | 2/2006 |
| EP | 1 931 131 A1 | 6/2008 |
| FR | 2616476 A1 | 12/1988 |
| TW | M298056 | 9/2006 |
| TW | M440380 | 11/2012 |
| WO | 2013/121207 A1 | 8/2013 |

* cited by examiner

MOUNT FOR A WIRED DEVICE

TECHNICAL FIELD

The present invention relates to the field of mounts for devices, and in particular to mounts for wired devices, and a method for mounting said mount.

BACKGROUND OF THE INVENTION

Various types of mounts exist for different kinds of wired devices. Besides facilitating mounting of a wired device, the mount typically also provides a protective enclosure thereof. There exist mounts adapted for indoor and outdoor application, and for different mounting locations such as walls or ceilings.

One type of mounts for wired devices comprises a base and a cover. The cover may be arranged on the base such that a closed space is formed, and the entire wired device, or parts thereof, is arranged in the protective closed space. By removal of the cover, the space may be accessed which is favorable during installation or maintenance of the wired device.

Mounts for some types of wired devices, such as surveillance cameras, are typically installed in places that are difficult to access, such as many meters off the ground on a building wall. Access to the mount and to the wired device typically requires that the installation or maintenance personnel stand on a ladder or the like when performing their work. This positioning renders the work more challenging. It may for example be difficult for a workman to hold onto the cover, when it is disengaged from the base, while fastening the mount base to the wall or while connecting wires or electrical devices to the wired device during installation.

One solution to this problem is to fasten the cover to the base by means of a hinge. The hinge enables positioning of the cover in an open position, where access to the space (typically the interior of the base) is provided, without the need for the workman to hold onto the cover. However, this solution may make the mounting of the base cumbersome, since the base and the cover attached thereto might be quite heavy. Also, the hinge might limit the movement of the cover. This poses a problem when it is desired to seal the space inside the mount, for providing a protected environment. A good sealing is facilitated by an exact positioning of the cover in relation to the base, which may be hindered by the limited positioning possibilities of the cover. Due to the same reasons, fastening of the cover to the mount, by for example screws where screws holes of the cover and the base needs to be carefully fitted, may also become difficult.

From the above discussion, there is evidently a need for an improved mount.

SUMMARY OF THE INVENTION

It is an object of the present invention to provide an improved mount for a wired device, and to facilitate installation and maintenance of the mount and/or the wired device thereof.

According to a first aspect of the invention, this and other objects are achieved by a mount for a wired device, the mount comprising: a base arranged to be mounted in a mount plane; an attachment part provided with a terminal for the wired device; and an eccentric hinge having a first pivot attached to the base, and a second pivot. The second pivot is movable relative the first pivot in a plane defined by a first direction X parallel to the mount plane and by a second direction Z normal to the mount plane. The attachment part is releasably connectable, by a relative motion of the attachment part in relation to the base, to the base by means of the eccentric hinge. The attachment part, when connected to the base, is movable, by articulation about the eccentric hinge, between an open position, providing access to the terminal, and a closed position in which the terminal is located within a sealed space formed by the attachment part and the base, and in which the eccentric hinge is arranged outside the sealed space. The distance between the first pivot and the second pivot in the closed position has a first component in the first direction X and a second component in the second direction Z, the first component being greater than the second component.

The attachment part provides both a cover function and access to the terminal therein. The terminal is arranged such that at least an exterior part of the terminal is accessible when the attachment part is arranged in the open position. The exterior part may comprise connectors to interior parts of the terminal. In the closed position, the exterior part of the terminal faces the sealed space and is thus inaccessible.

An advantage of the invention is that the eccentric hinge with multiple pivots, i.e. with at least two pivots, permits movement of the attachments part in multiple directions. Thus, the attachment part with a multi-pivoted hinge may move more freely in relation to the base in relation to a single-pivoted hinge. When the attachment part is positioned in the open position, the attachment part may be articulated about the second pivot. A workman may thus adjust the attachment part to better fit his working position.

Another advantage is that the attachment part is movable, due to the second pivot, in the direction Z normal to the mount plane. The attachment part may thus be positioned in the closed position by moving the attachment part towards the base. Thus, an improved sealing between the attachment part and the base may be achieved. The sealing may be further enhanced by a sealing element. The sealing element may be a sealing rim arranged on the base or on the attachment part. In the closed position, the sealing element is located between the attachment part and the base.

Another advantage of the invention is that the eccentric hinge is positioned such that movement along the first direction X parallel to the mount plane is small when the attachment part is positioned in and nearby the closed position. Since the first component of the distance, between the first pivot and the second pivot, in the first direction X is greater than the corresponding second component in the second direction Z, any movement of the attachment part is performed mainly in the second direction Z, i.e. normal to the mount plane. Thus, fastening of the attachment part to the mount base or the mount plane may be facilitated since the attachment part is less prone to move in the first direction X parallel to the mount plane.

Another advantage of the invention is that the terminal is located in the attachment part and that the attachment part is releasably connected to the base. The installation of the mount and the wired device may thus be performed in two steps: a first step where the base is fastened to the mount plane, for example a building wall, and the necessary cabling to the mount is performed; and a second step where the attachment part including the terminal is attached to the base and the installation and configuration of the specific wired device is performed. The steps may be performed separated in time and by separate persons. The first more general step may be performed by an electrician, and the second more specific step may be performed by a specialist.

Since knowledge of one step is not needed for performing the other, the group of suitable installers is much greater than if a single installer needs knowledge for performing both steps.

The first pivot may be arranged, as seen in a projection in the plane defined by the first direction X and the second direction Z, within the base. In other words, the first pivot is arranged above or below the base. Thus, the first pivot does not affect the lateral extension of the base.

The attachment part may be releasably connectable to the base in a portion thereto proximal to the base in the open position. The eccentric hinge will thus not limit the access to the terminal of the attachment part.

The eccentric hinge may be arranged such that the second pivot is movable between a first position for connection of the attachment part to the base and a second position for the closed position of the attachment part. The second pivot may be biased towards the first position. Thus, the second pivot is prone to move towards and stay in the position in which it is easy to attach the attachment part to the base. This feature facilitates the step of connecting the attachment part to the base.

The second pivot may be biased by means of one or a combination of the following: a spring, a magnetic element, a snap arrangement or the like.

The terminal functions as an intermediate device between the wired device and exterior devices, such as network stations or servers. The terminal may be an integral part of the wired device or form a separate device. The terminal may comprise means for handling one or a combination of the following: network signals, power control, control signals, surveillance signals, audio signals, image signals, video signals, data signals, alarm signals, and on/off switch control.

The base may comprise a cable entrance providing access for one or more external cables to the sealed space. The terminal may comprise connectors to which the wired device and/or the one or more external cables are connectable.

The sealed space may define a storage volume for storage of one or more cable sections of the external cables. Thus, the cable sections are protected and do not occupy any space outside the mount. An advantage of this is that the external cables are not in the way while moving the attachment part towards the closed position.

The wired device may comprise a camera, such as a surveillance camera. The wired device may form a part of the attachment part.

The mount may be adapted to the mounted such that the direction X is horizontal. Thereby, the movement of the second pivot is not affected by the gravitational force. Thus, the second pivot, on which the attachment part is arranged, may be positioned in any position without the position being influenced by the gravitational force.

According to a second aspect of the invention, the above and other objects are achieved by a method for mounting a mount for a wired device. The method comprises: arranging a base in a mount plane; releasably connecting an attachment part provided with a terminal for the wired device to the base via an eccentric hinge by moving the attachment part relative the base; arranging the attachment part in an open position providing access to the terminal; connecting external cables to the terminal; moving by articulation about the eccentric hinge the attachment part to a closed position in which the terminal is located within a sealed space formed by the attachment part and the base, and in which the eccentric hinge is arranged outside the sealed space.

Features and advantages of the first aspect are also applicable, where suitable, to this second aspect. In order to avoid undue repetition, reference is made to the above.

BRIEF DESCRIPTION OF DRAWINGS

This and other aspects of the present invention will now be described in more detail, with reference to the appended drawings showing embodiments of the invention.

DETAILED DESCRIPTION

The present invention will now be described more fully with reference to the accompanying drawings, in which currently preferred embodiments of the invention are shown. The invention may however be embodied in many different forms and should not be construed as limited to the embodiments set forth herein.

Figure 1:
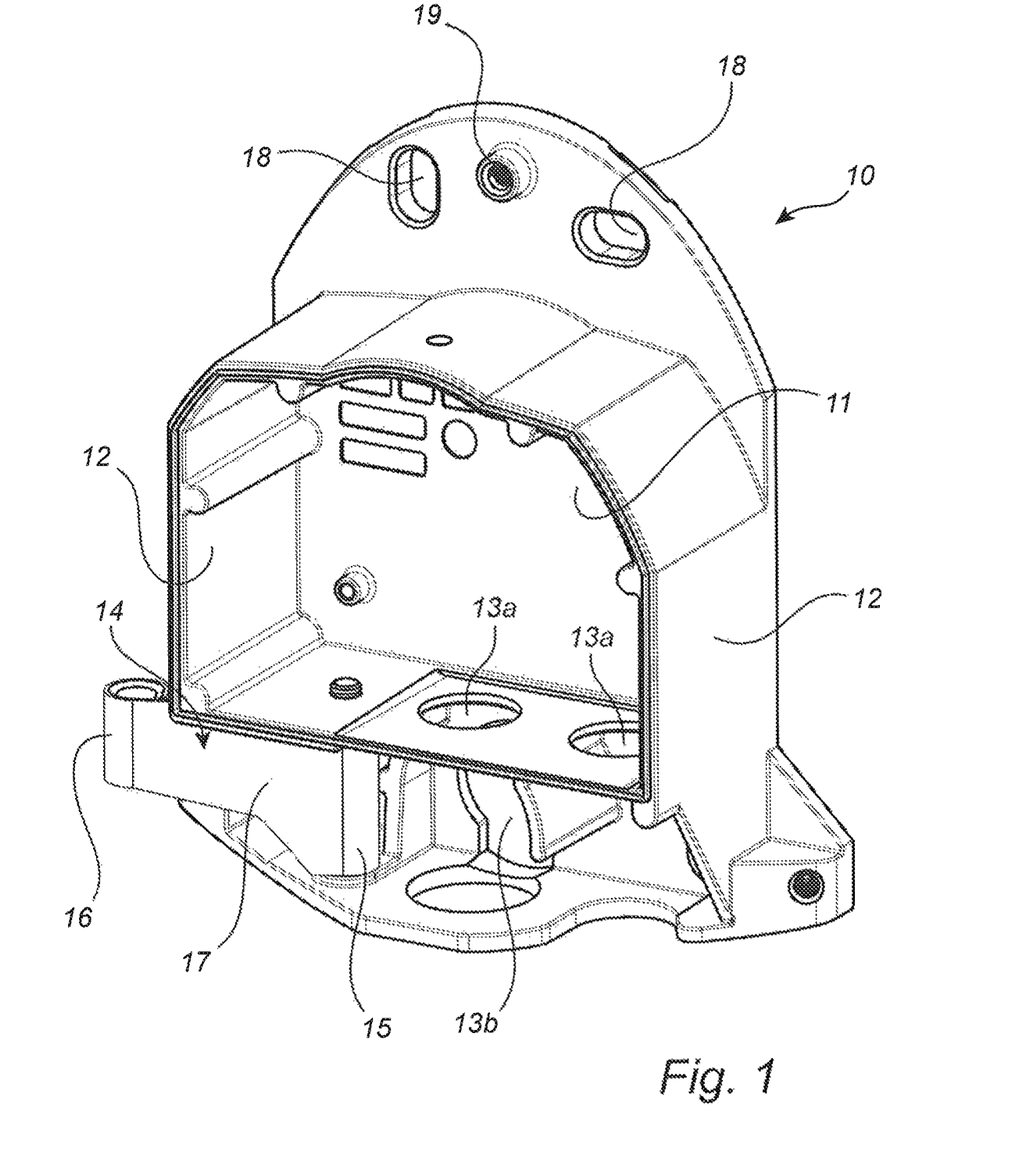
FIG. 1 illustrates a base and an eccentric hinge.

A base 10 of a mount for a wired device according to one embodiment of the invention is illustrated in FIG. 1. The base 10 comprises a bottom plate 11 and side surfaces 12 extending from the bottom plate 11. The base 10 is arranged to be mounted in a mount plane, by means of a suitable fastening means such as screws. In this embodiment, screw holes 18 are provided in the base 10 for mounting of the base 10. A screw hole 19 is also provided for mounting of an attachment part to the base 10.

The mount plane may be a mainly vertical surface, such as a wall. Alternatively, the mount plane may be a mount plate or a mount structure which in turn may be supported by a non-planar surface, such as a pole or a lamppost.

In an alternative embodiment, the bottom plate 11 of the base 10 may be omitted from the mount. The base 10 may in that case be mounted on a mount plane, such as a wall surface, which replaces the bottom plate 11.

Returning to the embodiment illustrated in FIG. 1, the base 10 comprises a first cable entrance 13a arranged in the base plate 11, and a second cable entrance 13b arranged in the side surface 12. The cable entrances provide access for one or more external cables to the interior of the base 10. An entrance cover (not shown) may be attached to each of the cable entrances when the particular cable entrance is not in use.

The mount further comprises an eccentric hinge 14. The eccentric hinge 14 comprises a first pivot 15 and a second pivot 16. The first pivot 15 is attached to a side surface 12 of the base 10. In the illustrated embodiment, the first pivot 15 is attached to an underside of the base 10. The first pivot 15 and the second pivot 16 are connected to each other via an arm 17.

Figure 2:
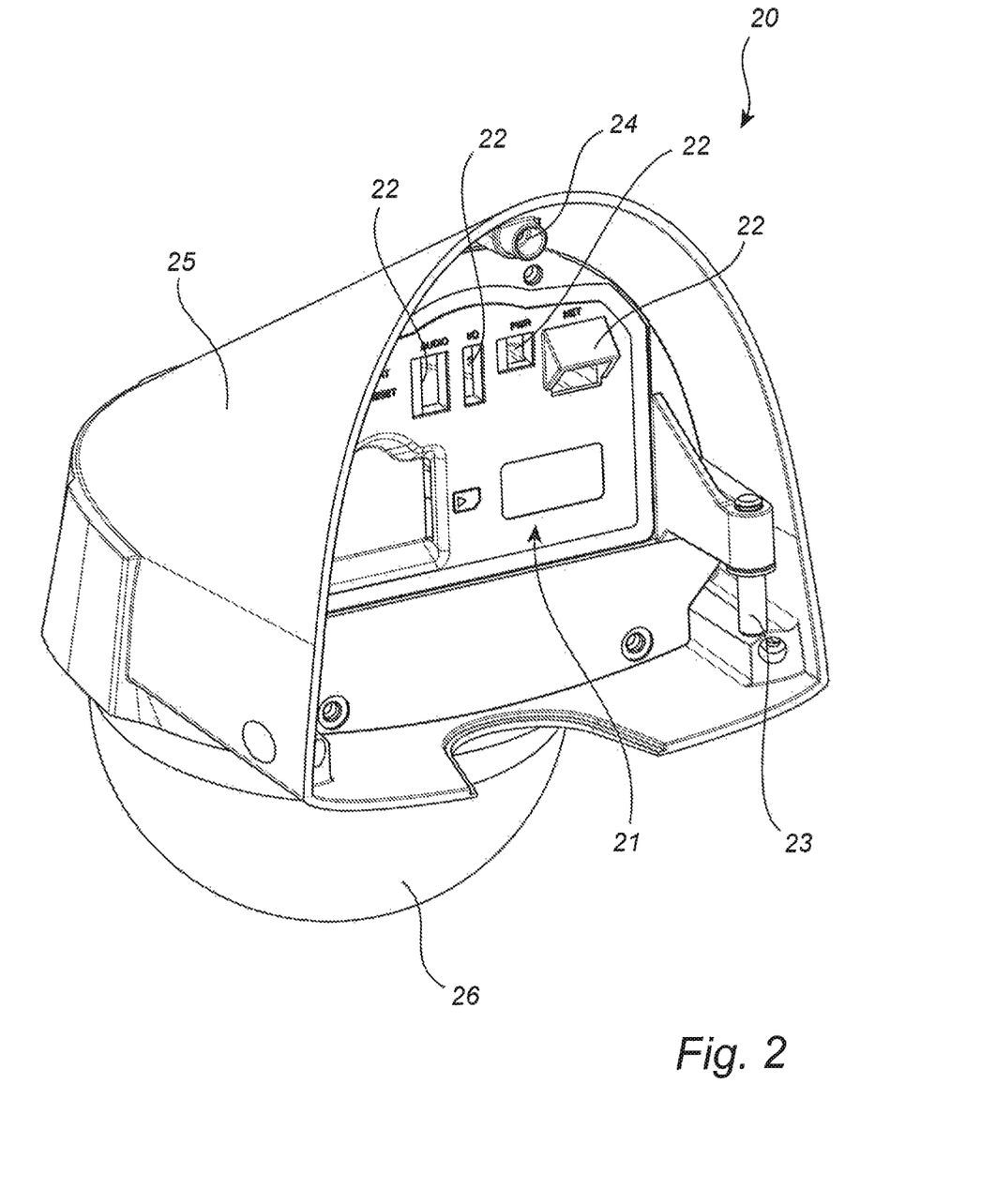
FIG. 2 illustrates an attachment part with a terminal.

An attachment part 20, as seen from a terminal side, arranged to be connected to the base 10 is illustrated in FIG. 2. The attachment part 20 comprises a terminal 21.

The terminal 21 functions as an intermediate device between the wired device and exterior devices, such as network stations or servers. The terminal 21 is here a separate device, but may in other embodiments form an integral part of the wired device. The terminal 21 comprises means for handling different functions and signals of the wired device. Non-limiting examples of such means are a network card for handling network signals, a power switch for handling power control and/or on/off switching, an image and/or video processor for handling image and/or video signals, and a CPU for handling various types of data signals. The terminal 21 may comprise both means for controlling the wired device and means for handling signals and data transmitted from or to the wired device.

The terminal 21 is adapted to be connected to both the wired device and to one or more external devices. The wired device is in this embodiment a surveillance camera 26. The surveillance camera 26 is arranged in an extending part 25 of the attachment part 20.

The terminal 21 is connected to the surveillance camera 26 via internal cables and to external devices by external cables. The internal cables are arranged in the interior of the attachment part 20. As mentioned before, the terminal 21 and the wired device may alternatively form a single device. In that case, the internal cables are arranged in that single device.

The external cables are provided through one or more of the cable entries 13a, 13b of the base 10. The external wires may be connected to the terminal 21 by means of connectors 22 located on the terminal 21. The connectors 22 are arranged on an exterior part of the terminal 21.

The cable entries may be provided with grommets (not shown) providing sealed passage of the external cables.

The means for handling different functions and signals are arranged in an interior part of the terminal 21. Since different types of signals and functions are handled, different type of connectors 22 are provided, such as network connectors, power connectors, image data connectors, etc.

The attachment part 20 further comprises a pivot pin 23. By means of the pivot pin 23, the attachment part 20 is releasably connectable to the base 10 via the eccentric hinge 14. The pivot pin 23 is connectable to the second pivot 16 by a relative motion of the attachment part 20 in relation to the base 10, i.e. by hanging the attachment part 20 onto the second pivot 16 means of the pivot pin 23. Alternatively, the pivot pin 23 may be supported by the arm 17.

Figure 3A:
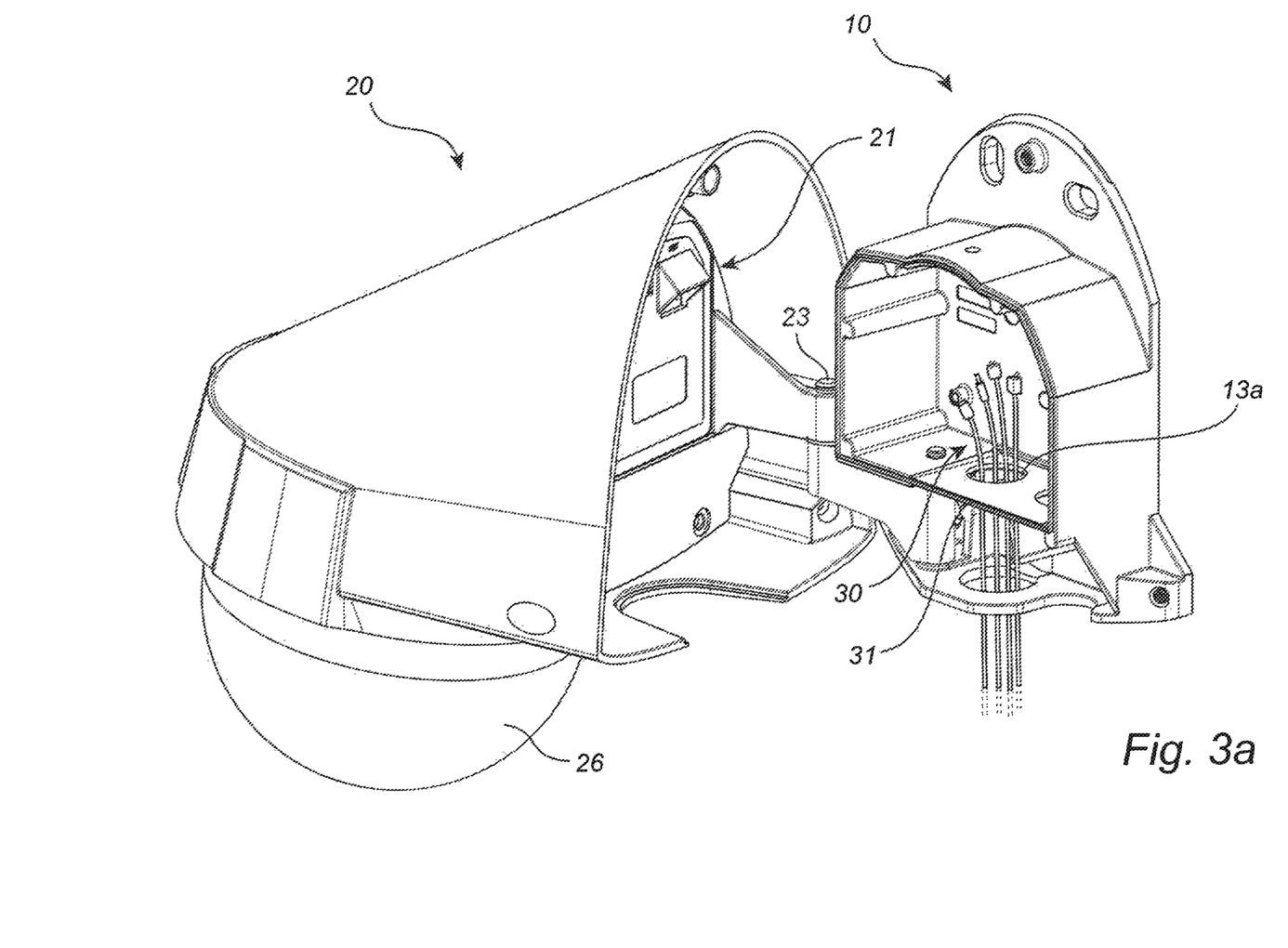
FIG. 3a-3c are side illustrate a movement of the attachment part from an open position to a closed position.
Figure 3B:
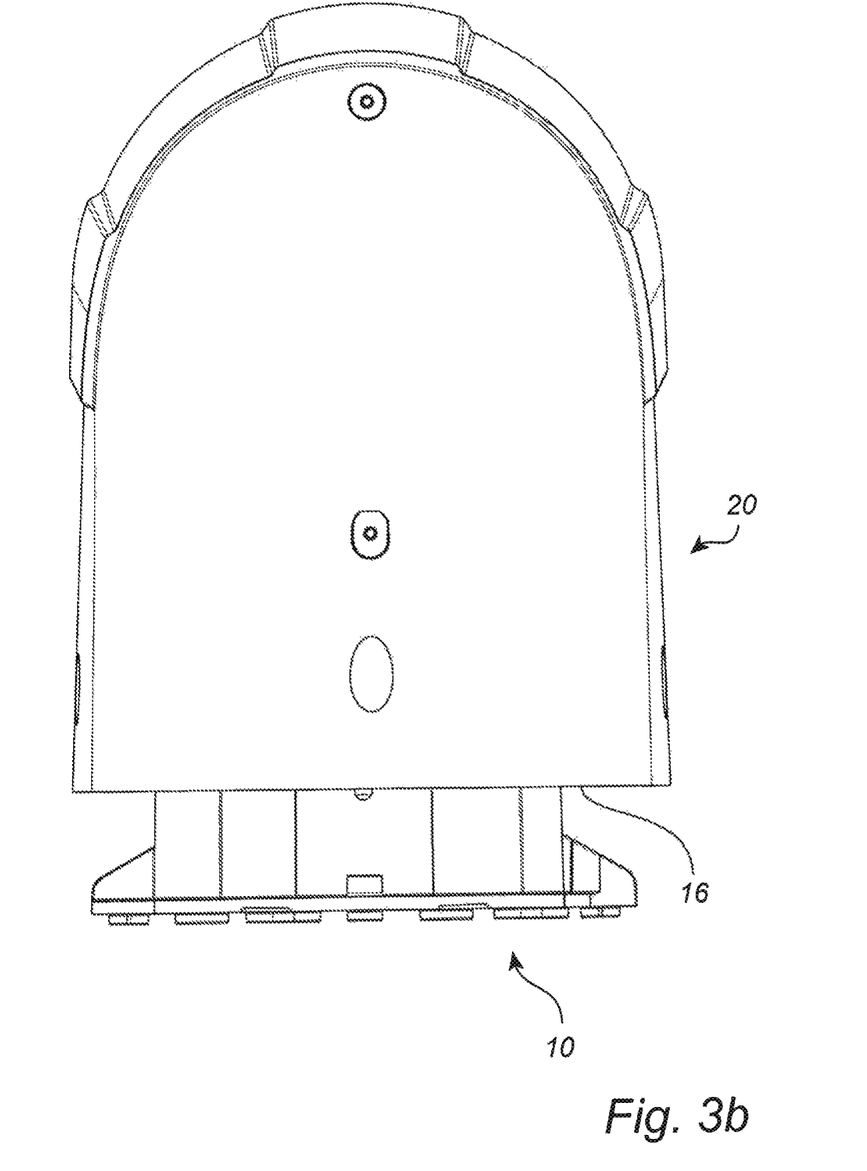
Figure 3C:
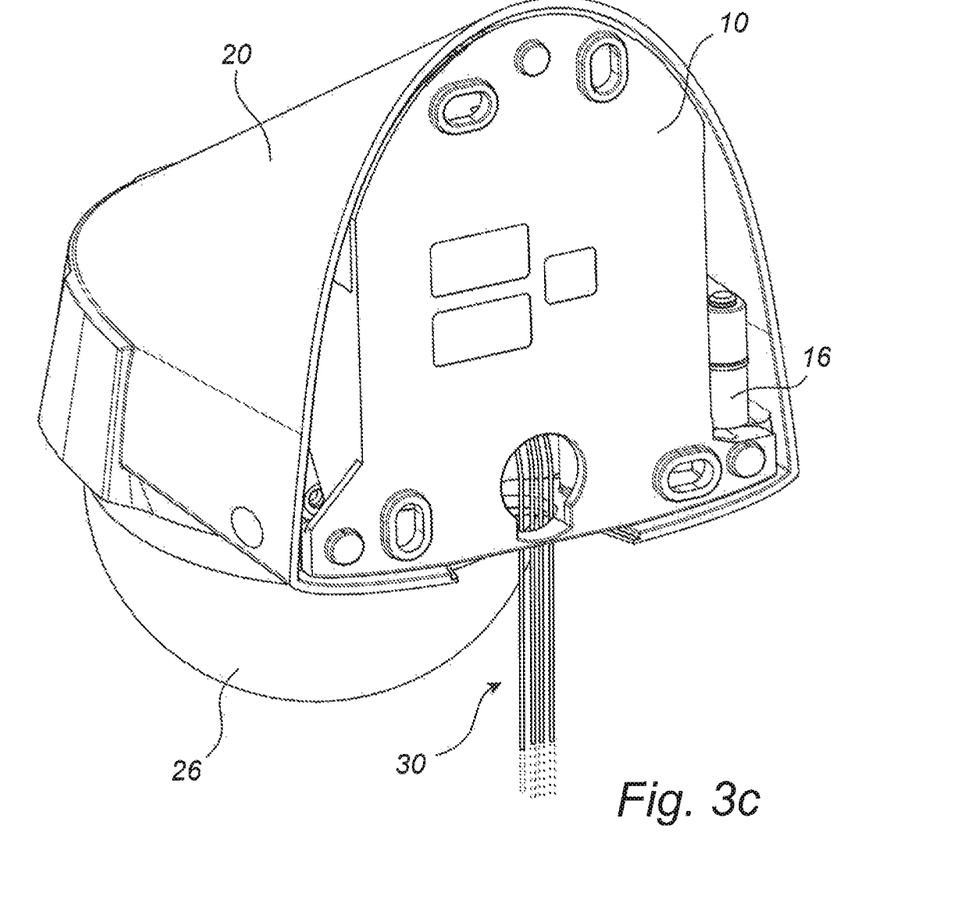

The movement of the attachment part 20, when attached to the base 10, will now be disclosed with reference to FIGS. 3a-3c. This movement is provided for use during installation of the mount and the wired device, and for use during for example maintenance when access to the interior of the base is needed.

The attachment part 20 is connected to the base 10, by means of the above described relative motion of the attachment part 20 in relation to the base 10, and arranged in an open position in FIG. 3a. In the open position, at least a part of the terminal 21 is accessible for a workman located in front of the mount, i.e. facing the base 10 and the mount plane. The attachment part 20 may in the open position be articulated about the second pivot 16 such that its position in relation to the workman is fine tuned.

The eccentric hinge 14 may be arranged such that the second pivot 16 is biased towards a position for connecting of the attachment part 20, i.e. the position of the second pivot 16 as illustrated in FIG. 3a. Thus, the second pivot 16 is prone to move towards and stay in this position. This feature facilitates the step of connecting the attachment part 20 to the base 10 by the relative motion of the attachment part 20 in relation to the base 10, i.e. by arranging the attachment part 20 onto the second pivot 16.

The second pivot 16 may be biased by means of a spring, a magnetic element, a snap arrangement or the like.

In the open position, the connectors 22 located on the exterior part of the terminal 21, are accessible for the workman. External cables 30, provided through the cable entry 13a, may thus easily be connected to the different connectors 22. In an alternative embodiment, the external cables 30 may be provided through the cable entry 13b as illustrated in FIG. 1.

The pivot pin 23 is arranged at a proximal portion of the attachment part 20 in relation to the base 10. Thus, neither the pivot pin 23 nor the arm 17 of the eccentric hinge 14 will limit the access to the terminal 21.

By the second pivot 16, the attachment part 20 is movable, by articulation about the second pivot 16, to a closed position.

FIG. 3b is a view from above and illustrates an intermediate position between the open position of FIG. 3a and the closed position which is illustrated in FIG. 3c.

The terminal 21 is here inaccessible for the workman. When the attachment part 20 is located essentially in line with the base 10, as in FIG. 3b, the attachment part 20 forms a cover to the base 10, in this position, a closed spaced is formed by the base 10 and the attachment part 20. The terminal 21 is in this position facing the closed space and thus being protected. Sections of the external cables located between the cable entry 13a and the connectors 22 may be stored in the volume defined by the closed space In order to achieve an optimized protection for the terminal 21 and the interior of the closed space, it is desirable to seal the closed space. The attachment part 20 is therefore arranged to be movable, by means of the eccentric hinge 14, towards the base 10, and into the position referred to as the closed position. In FIG. 3c, which is a perspective view from behind the base 10, the attachment part 20 is arranged in the closed position.

The movement of the attachment part 20 towards the base 10 is enabled by that the second pivot 16 is movable in relation to the first pivot 15. The sealing is enhanced by a sealing rim 31, illustrated in FIG. 3a, which is arranged on top of the side surfaces 12 of the base. Alternatively, the sealing rim 31 may extend around an edge portion of the attachment part 20.

The inventive positioning and function of the eccentric hinge 14 will now be disclosed in more detail with reference to schematic FIGS. 4a-4e. These figures are views from above of the mount illustrated in FIGS. 1-3c. FIG. 4a-4e illustrate the movement of the attachment part 20 from the open position to the closed position.

Figure 4A:
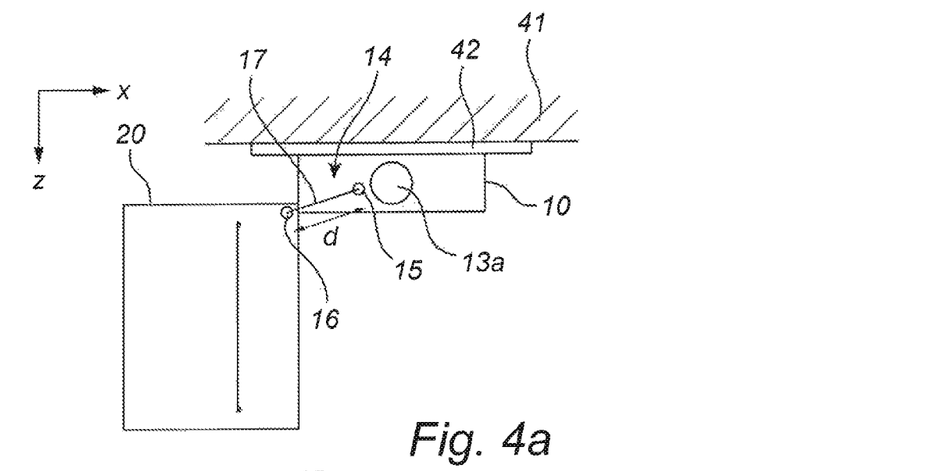
FIG. 4a-4e are top plan views illustrating a movement of the attachment part from an open position to a closed position.

In FIG. 4a, the attachment part 20 is arranged in the open position, thereby providing access to the terminal 21 therein. The base 10 is in this embodiment attached to a mount plane in the form of a mount plate 42. The mount plate 42 is in turn is arranged on a wall 41.

The eccentric hinge 14 is provided on an underside of the base 10, at the far side of the side surface 12 of the base 10 in this view from above. The eccentric hinge 14 is arranged in a plane defined by a first direction X and a second direction Z. The first direction X is parallel to the mount plane and the second direction Z is normal to the mount plane. The second pivot 16 is thus movable in relation to the first pivot 15 in the plane defined by the first direction X and the second direction Z.

From the open position, the attachment part 20 is moved to the closed position by a combination of a closing movement and a sealing movement. In this embodiment, the attachment part 20 is first moved in the closing movement, and thereafter moved in the sealing movement directed mainly in the second direction Z. The closing movement is performed by articulation of the attachment part 20 about the second pivot 16. The sealing movement is performed by articulation of the attachment part 20 and the second pivot 16 about the first pivot 15.

Figure 4B:
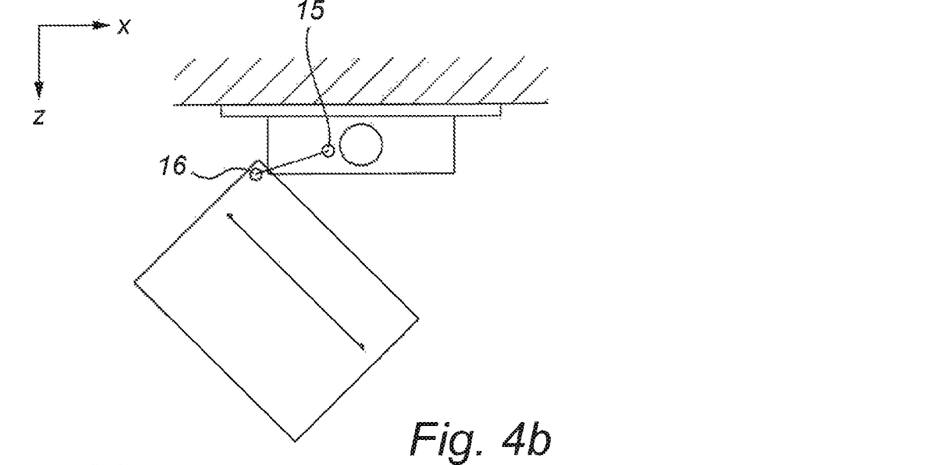

In FIG. 4b, the attachment part 20 has performed a part of the closing movement.

Figure 4C:
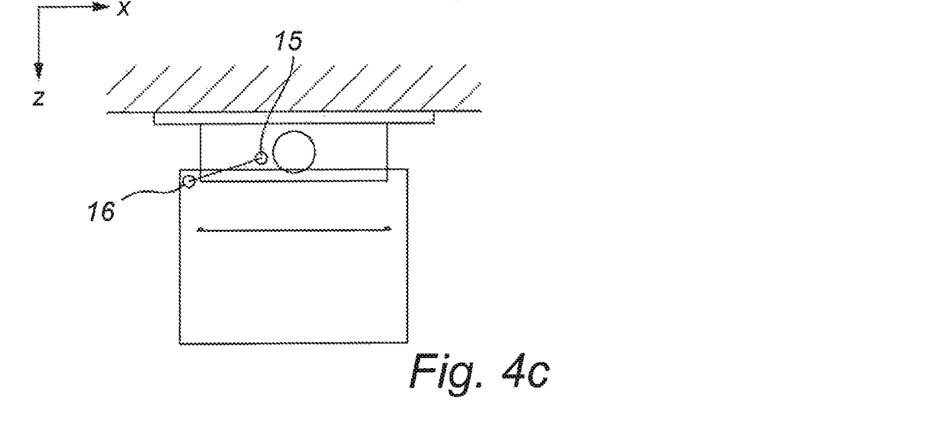

In FIG. 4c, the attachment part 20 has performed whole of the closing movement and is now located in front of, and in line with, the base 10. In this position, a closed space is formed by the base 10 and the attachment part 20. For sealing the space, the attachment part 20 will now perform the sealing movement towards the base 10.

Figure 4D:
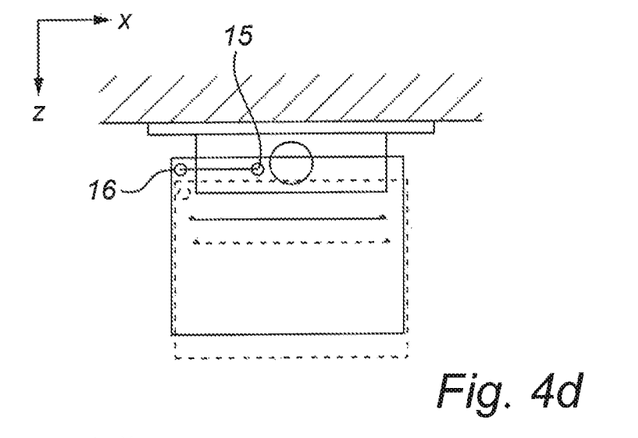
Figure 4E:
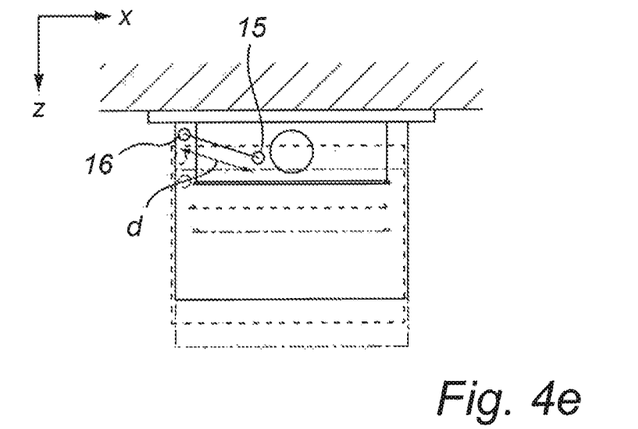

In FIG. 4d, the attachment part 20 has performed a part of the sealing movement. In FIG. 4e, the sealing movement has been performed in full. The attachment part 20 is now positioned in the closed position.

Figure 5:
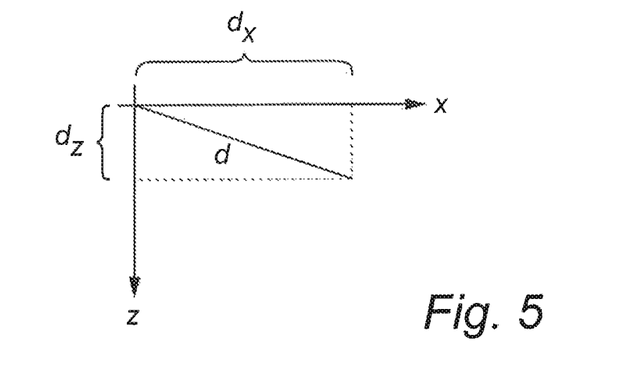
FIG. 5 illustrates a positioning of a first pivot and a second pivot of the eccentric hinge.

The distance d between the first pivot 15 and the second pivot 16, i.e. the length of the arm 17 in this case, in the closed position in view of the first direction X and the second direction Z is illustrated in FIG. 5. The distance d has a first component $d_X$ in the first direction X and a second component $d_Z$ in the second direction Z.

Since the eccentric hinge 14 is positioned such that the component $d_X$ is greater than the component $d_Z$, the sealing movement of the attachment part 20 is essentially performed along the second direction Z, i.e. towards the base 10 and towards the mount plane. Further, any movement of the attachment part 20, when positioned in the closed position, will be performed essentially along the second direction Z.

The sealing movement is of course an articulating movement about the first pivot 15, however the movement is performed along a part of an articulation circle where movement in the second direction Z is maximized and movement in the first X direction is minimized. Thus, the first pivot 15 is located in view of the second pivot 16 in a particular manner in order to achieve that the movement of the attachment part 20 towards the base 10 is directed mainly in the second direction Z towards the base 10.

The positioning of the eccentric hinge 14 also provides that movement of the attachment part 20 in the first direction X, when the attachment part 20 is positioned in and nearby the closed position, is smaller than the movement in the second direction Z. This feature alleviates fastening of the attachment part 20 to for example the base 10 or the mount plane. As can be seen in FIG. 2, a screw hole 24 is provided for fastening of the attachment part 20 to the base 10, via the screw hole 19 of the base. The screw hole 24 is arranged in the second direction Z for providing easy access for the workman who is located facing the mount and the mount plate 42. The workman can easily fasten the attachment part 20 by e.g. screws arranged along the second direction Z, without any substantial movement of the attachment part 20 sideways, i.e. in the first direction X.

In this embodiment, the first pivot 15 is positioned, in respect of the second direction Z, between the starting position and final position of the second pivot 16 in the sealing movement. This positioning of the first pivot 15 provides an optimal relation between the movement in the first direction X and movement in the second direction Z of the attachment part 20 during the sealing movement.

In this embodiment, the first pivot 15 is located at the same side of the cable entrance 13a as the second pivot 16. Hence, the arm 17 of the eccentric hinge 14 is not in the way for any external cables arranged in the cable entrance 13a. However, in embodiments not utilizing a cable entrance positioned in this manner, the first pivot may be positioned farther away from the second pivot in order to obtain a better proportion between the components in the first direction X and the second direction Z for the sealing movement of the attachment part 20.

In this embodiment, the direction X is horizontally arranged, i.e. it has no vertical extension. Thereby, the movement of the second pivot 16 is not affected by the gravitational force. Thus, the second pivot 20, on which the attachment part 20 is arranged, may be positioned in any position without the position being influenced by the gravitational force.

It is appreciated by the skilled person that the closing movement and the sealing movement do not need to be executed in a subsequent order. Hence, the movements may be performed in parallel, by turns, or in any order permitted by the eccentric hinge 14.

Figure 6:
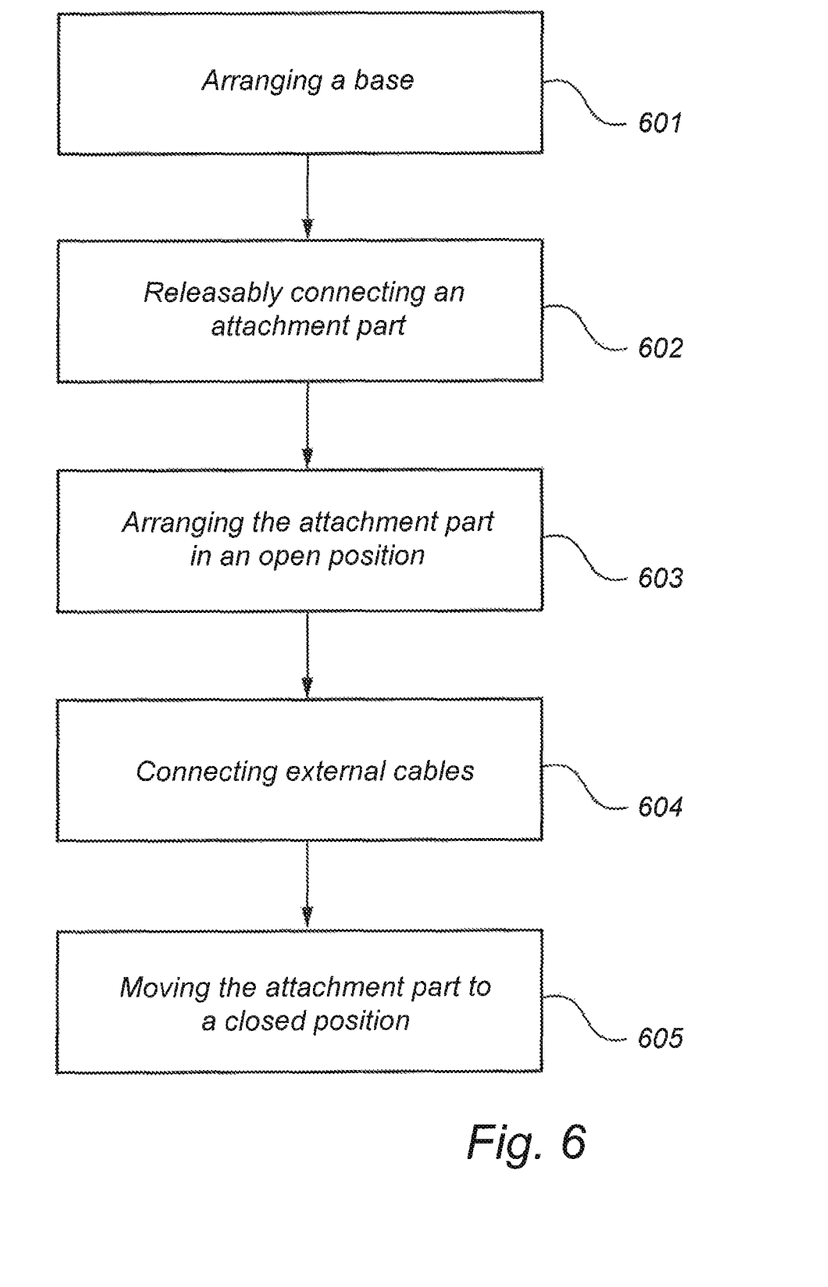
FIG. 6 illustrates a method for mounting a mount according to the present invention.

FIG. 6 illustrates a method for mounting the mount which has been described above.

In a first step 601, the base 10 is mounted in the mount plane.

In a second step 602, the attachment part 20 provided with the terminal 21 is releasably connected to the base 10 via the eccentric hinge 14 by moving the attachment part 20 relative the base 10.

In a third step 603, the attachment part 20 is arranged in an open position providing access to the terminal 21.

The second step 602 and the third step 603 may be performed as a single step.

In a fourth step 604, external cables are connected to the terminal 21.

In a fifth step 605, the attachment part 20 is moved by articulation about the eccentric hinge to a closed position in which the terminal 21 is located within a sealed space formed by the attachment part 20 and the base 10. The eccentric hinge 14 is arranged outside the sealed space. This step comprises a combination of the two movements disclosed above, i.e. the closing movement and the sealing movement.

The method may be performed by different workmen. The step of mounting 601 the base 10 may be performed by a general installation workman. This step may also comprise arranging external cables through one or more cables entrances of the base 10.

The subsequent steps of connecting 602 and arranging 603 the attachment part 20, connecting 604 the external cables and moving 605 the attachment part 20 to the closed position, is preferably performed by a workman specialized in the type of wired device in question. For example, if the wired device is a surveillance camera, the initial steps relating to the base 10 may be performed by an electrician and the final steps relating to the attachment part 20 may be performed by a workman with special knowledge in camera installations or even in the specific type of camera in question. Since knowledge of the final steps is not needed for performing the initial steps, and vice versa, the number of suitable installation workmen is higher than if the installer is required to perform all installation steps. Also, the initial steps and the final steps may be performed at different points in time. Thus, the freedom of how to form and execute the installation is increased, thereby simplifying the installation procedure.

The person skilled in the art realizes that the present invention by no means is limited to the preferred embodiments described above. On the contrary, many modifications and variations are possible within the scope of the appended claims. For example, the wired device could be a loudspeaker, a microphone, a light source, a display, a video projector, a home appliance, a computer, a vending machine, a ticket machine or a combination thereof.

The invention claimed is:

1. A surveillance camera mount, the mount comprising:
a base arranged to be mounted in a mount plane;
an attachment part provided with a terminal for a surveillance camera; and
an eccentric hinge having a first pivot attached to said base, and a second pivot;
said second pivot being movable relative said first pivot in a plane defined by a first direction (X) parallel to said mount plane and by a second direction (Z) normal to said mount plane;
said attachment part being releasably connectable, by a relative motion of said attachment part in relation to said base, to said base by means of said eccentric hinge,
wherein said attachment part, when connected to said base, is movable, by articulation about said eccentric hinge, between an open position, providing access to said terminal, and a closed position in which said terminal is located within a sealed space formed by said attachment part and said base, and in which said eccentric hinge is arranged outside said sealed space; and
wherein a distance (d) between said first pivot and said second pivot in said closed position has a first component (dX) in said first direction (X) and a second component (dZ) in said second direction (Z), said first component (dX) being greater than said second component (dZ).

2. The mount according to claim 1, wherein said first pivot is arranged, as seen in a projection in the plane defined by said first direction (X) and said second direction (Z), within said base.

3. The mount according to claim 1, wherein said attachment part is releasably connectable to said base in a portion thereto proximal to said base in said open position.

4. The mount according to claim 1, wherein said eccentric hinge is arranged such that the second pivot is movable between a first position for connection of said attachment part to said base and a second position for the closed position of the attachment part.

5. The mount according to claim 4, wherein said second pivot is biased towards said first position.

6. The mount according to claim 5, wherein said second pivot is biased by means of one or a combination of the following: a spring, a magnetic element, a snap arrangement or the like.

7. The mount according to claim 1, further comprising a sealing element arranged for sealing said space in said closed position.

8. The mount according to claim 1, wherein the terminal comprises means for handling one or a combination of the following: network signals, power control, control signals, surveillance signals, audio signals, image signals, video signals, data signals, alarm signals, and on/off switch control.

9. The mount according to claim 1, wherein the base further comprises a cable entrance providing access for one or more external cables to said sealed space.

10. The mount according to claim 9, wherein said terminal comprises connectors to which said surveillance camera and/or said one or more external cables are connectable.

11. The mount according to claim 9, wherein said sealed space defines a storage volume for storage of one or more cable sections of said external cables.

12. The mount according to claim 1, wherein said surveillance camera forms a part of said attachment part.

13. The mount according to claim 1, wherein said mount is adapted to be mounted such that said direction (X) is horizontal.

* * * * *